US012739720B2

(12) United States Patent
Zhang et al.

(10) Patent No.: US 12,739,720 B2
(45) Date of Patent: Sep. 15, 2026

(54) CALL SWITCHING METHOD AND APPARATUS, STORAGE MEDIUM AND MOBILE TERMINAL

(71) Applicant: HUIZHOU TCL MOBILE COMMUNICATION CO., LTD, Huizhou (CN)

(72) Inventors: Junjie Zhang, Huizhou (CN); Hai Cai, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 976 days.

(21) Appl. No.: 17/758,199

(22) PCT Filed: Feb. 20, 2020

(86) PCT No.: PCT/CN2020/076014

§ 371 (c)(1),
(2) Date: Jun. 29, 2022

(87) PCT Pub. No.: WO2021/134866

PCT Pub. Date: Jul. 8, 2021

(65) Prior Publication Data

US 2023/0050252 A1 Feb. 16, 2023

(30) Foreign Application Priority Data

Dec. 31, 2019 (CN) ......................... 201911420082.4

(51) Int. Cl.
*H04W 36/24* (2009.01)
*H04W 36/00* (2009.01)
(Continued)

(52) U.S. Cl.
CPC ... *H04W 36/249* (2023.05); *H04W 36/00226* (2023.05); *H04W 76/16* (2018.02); *H04W 88/06* (2013.01)

(58) Field of Classification Search
None
See application file for complete search history.

(56) References Cited

U.S. PATENT DOCUMENTS

2008/0102844 A1* 5/2008 Zhu ........................ H04L 45/308 455/445
2009/0003316 A1* 1/2009 Lee ..................... H04L 65/1053 370/352
(Continued)

FOREIGN PATENT DOCUMENTS

CN 1747576 A 3/2006
CN 102447793 A 5/2012
(Continued)

OTHER PUBLICATIONS

International Search Report in International application No. PCT/CN2020/076014 , mailed on Sep. 21, 2020.
(Continued)

*Primary Examiner* — Bob A Phunkulh
(74) *Attorney, Agent, or Firm* — PV IP PC; Wei Te Chung

(57) ABSTRACT

A call switching method and apparatus, a storage medium and a mobile terminal. The method comprises: when a first call module receives a call request of a first call type, triggering a second call module to query whether a call of a second call type is being executed; if a call of the second call type is currently being executed, the first call module generating prompt information; and when a first user
(Continued)

Triggering a second call module to query whether a call of which call type is a second call type is currently executed when it is detected that a first call module receives a call request of which call type is a first call type — 101

Controlling the first call module to generate prompt information is a call of which call type is the second call type is currently executed — 102

Switching the current call from a call of the second call type to a call of the first call type when a first user instruction fed back by the user according to the prompt information is detected — 103 instruction of a user is detected, switching the current call from the call of the second call type to a call of the first call type.

19 Claims, 3 Drawing Sheets

(51) Int. Cl.
*H04W 76/16* (2018.01)
*H04W 88/06* (2009.01)

(56) References Cited

U.S. PATENT DOCUMENTS

2009/0022103 A1* 1/2009 Shatsky .......... H04W 36/00224 370/331
2009/0023450 A1* 1/2009 George ........... H04W 36/00224 455/442
2010/0111002 A1* 5/2010 Xu ...................... H04L 65/1016 370/352
2011/0268023 A1* 11/2011 Srinivasan .......... H04L 65/1086 370/328
2012/0087339 A1* 4/2012 Wu ................. H04W 36/00226 370/331
2014/0063175 A1* 3/2014 Jafry ................... H04L 65/1069 348/14.02
2015/0131619 A1* 5/2015 Zhu ................. H04W 36/00224 370/332
2016/0227024 A1* 8/2016 Vendrow ............. H04M 1/2535
2017/0180429 A1 6/2017 Österlund et al.
2018/0288228 A1* 10/2018 Frazier .............. H04M 3/42246
2018/0316542 A1 11/2018 Cerami et al.
2019/0373515 A1* 12/2019 Balasubramanian ........................ H04L 65/1016
2023/0039225 A1* 2/2023 Zhang ................. H04L 65/1059

FOREIGN PATENT DOCUMENTS

CN 103973882 8/2014
CN 105848233 A 8/2016
CN 106559544 A 4/2017
IN 202979085 U 6/2013

OTHER PUBLICATIONS

Written Opinion of the International Search Authority in International application No. PCT/CN2020/076014, mailed on Sep. 21, 2020.
Chinese Office Action issued in corresponding Patent Application No. 201911420082.4 dated Sep. 2, 2020, pp. 1-6.

* cited by examiner

31 Query unit

32 Generating unit

33 Switching unit

CALL SWITCHING METHOD AND APPARATUS, STORAGE MEDIUM AND MOBILE TERMINAL

CROSS REFERENCE TO RELATED APPLICATIONS

The present application is a US national phase application based upon an International Application No. PCT/CN2020/076014, filed on Dec. 20, 2020, titled "CALL SWITCHING METHOD AND APPARATUS, STORAGE MEDIUM AND MOBILE TERMINAL", which claims priority to Chinese patent application No. 201911420082.4, titled "CALL SWITCHING METHOD, DEVICE, STORAGE MEDIUM AND MOBILE TERMINAL", filed with the National Intellectual Property Administration on Dec. 31, 2019, which is incorporated by reference in the present application in its entirety.

BACKGROUND OF DISCLOSURE

1. Field of Disclosure

The present application relates to the field of communication, and in particular, to a call switching method, apparatus, storage medium and mobile terminal.

2. Description of Related Art

Voice calls are a core base function of mobile phones. Solutions including circuit-switched (CS) voice call and Internet Protocol (IP) multimedia subsystem (IMS) voice call of voice over long term evolution (VoLTE) and voice over WIFI (VoWiFi) provided by operators based on a traditional 2G/3G/4G network have become the mainstream in providing a very smooth call service experience to ordinary users and. These solutions come with an advantage in that the quality of the call service is guaranteed, and a disadvantage in tariff. Voice call solutions based on over the top (OTT), such as WeChat voice calls, Skype voice conference calls, etc., provide the advantage of being free, but the disadvantage is that the service quality cannot be guaranteed, which is greatly affected by the service quality of the carrying network. Therefore, in the early days of 2G/3G networks and 4G networks, when the per capita network rate is not high (about less than 10 Mbps), the calls are often laggy, or the sound quality is poor. The OTT voice call solutions were not popular.

With the global popularity of 4G high-speed networks (the per capita network rate can reach 10-50 Mbps), and gradual commercialization of 5G networks (the per capita network speed can reach 100-500 Mbps), voice calls based on OTT (Over The Top) will overcome the defects of poor call quality and develop rapidly. However, the two types of voice calls of current traditional voice and OTT voice have significant conflicts and poor experience in daily use by users. The performance is as follows: When a user is answering an OTT voice call, if a traditional voice call is dialed in, the OTT voice call will be interrupted directly. When a user is receiving a traditional voice call, if an OTT voice call is dialed in, there will be no obvious reminder for the user to choose and switch.

SUMMARY

Embodiments of the present application provide a call switching method, which can avoid conflicts and poor experience when multiple types of calls are used.

In a first aspect, an embodiment of the present application provides a call switching method, comprising:

triggering a second call module to query whether a call of which call type is a second call type is currently executed when it is detected that a first call module receives a call request of which call type is a first call type;

controlling the first call module to generate prompt information if a call of which call type is the second call type is currently executed;

switching a current call from a call of the second call type to a call of the first call type when a first user instruction fed back by a user according to the prompt information is detected.

In particular, the triggering a second call module to query whether a call of which call type is a second call type is currently executed comprises:

triggering the second call module to query a call state of the current call of the second call type;

The controlling the first call module to generate prompt information if a call of which call type is the second call type is currently executed comprises:

controlling the first call module to generate prompt information if the call state of the current call of the second call type is a first call state.

In particular, after the switching a current call from a call of the second call type to a call of the first call type when a first user instruction fed back by a user according to the prompt information is detected, the method further comprises:

marking a call state of the call of the second call type as a second call state and marking a call state of the call of the first call type as the first call state.

In particular, the method further comprises:

executing a call of which call type is the first call type if the call state of the current call of the second call type is the second call state.

wherein, after the executing a call of which call type is the first call type, the method further comprises:

marking the call state of the call of the first call type as the first call state.

In a second aspect, an embodiment of the present application provides a call switching apparatus, comprising:

a query unit configured to trigger a second call module to query whether a call of which call type is a second call type is currently executed when it is detected that a first call module receives a call request of which call type is a first call type;

a generating unit configured to control the first call module to generate prompt information if a call of which call type is the second call type is currently executed;

a switching unit configured to switch a current call from a call of the second call type to a call of the first call type when a first user instruction fed back by a user according to the prompt information is detected.

In particular, the query unit is specifically configured to trigger the second call module to query a call state of the current call of the second call type;

the generating unit is specifically configured to control the first call module to generate prompt information if the call state of the current call of the second call type is a first call state.

In particular, the call switching apparatus further comprises:

a marking unit configured to mark a call state of the call of the second call type as a second call state and mark a call state of the call of the first call type as the first call state.

In a third aspect, an embodiment of the present application provides a storage medium. A computer program is stored in the storage medium. When the computer program is executed in a computer, the computer performs the call switching method as descried above.

In a fourth aspect, an embodiment of the present application provides a mobile terminal. The mobile terminal comprises a processor and a memory, the memory stores a computer program, the processor calls the computer program stored in the memory to perform a call switching method, the call switching method comprises:

triggering a second call module to query whether a call of which call type is a second call type is currently executed when it is detected that a first call module receives a call request of which call type is a first call type;

controlling the first call module to generate prompt information if a call of which call type is the second call type is currently executed;

switching a current call from a call of the second call type to a call of the first call type when a first user instruction fed back by a user according to the prompt information is detected, wherein the first call module is an audio group dialer module, and the second call module is a VoIP application module.

In particular, the triggering a second call module to query whether a call of which call type is a second call type is currently executed comprises:

triggering the second call module to query a call state of the current call of the second call type;

the controlling the first call module to generate prompt information if a call of which call type is the second call type is currently executed comprises:

controlling the first call module to generate prompt information if the call state of the current call of the second call type is a first call state.

In particular, after the switching a current call from a call of the second call type to a call of the first call type when a first user instruction fed back by a user according to the prompt information is detected, the method further comprises:

marking a call state of the call of the second call type as a second call state and marking a call state of the call of the first call type as the first call state.

In particular, the method further comprises:

executing a call of which call type is the first call type if the call state of the current call of the second call type is the second call state.

In particular, after the executing a call of which call type is the first call type, the method further comprises:

marking the call state of the call of the first call type as the first call state.

The call switching method provided by the embodiment of the present application comprises: triggering a second call module to query whether a call of which call type is a second call type is currently executed when it is detected that a first call module receives a call request of which call type is a first call type; controlling the first call module to generate prompt information if a call of which call type is the second call type is currently executed; switching the current call from a call of the second call type to a call of the first call type when a first user instruction fed back by the user according to the prompt information is detected. By establishing interaction between the first call module and the second call module, the conflicts and poor experience which is induced when multiple types of calls are used can be prevented.

BRIEF DESCRIPTION OF DRAWINGS

In order to illustrate the technical solutions in the embodiments of the present application more clearly, the following briefly introduces the drawings that are used in the description of the embodiments. Obviously, the drawings in the following description are only some embodiments of the present application. For a person having ordinary skill in the art, other drawings can also be obtained from these drawings without creative works.

DETAILED DESCRIPTION OF EMBODIMENTS

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in the present application, all other embodiments obtained by a person having ordinary skill in the art without creative works fall within the protection scope of the present application.

Figure 1:
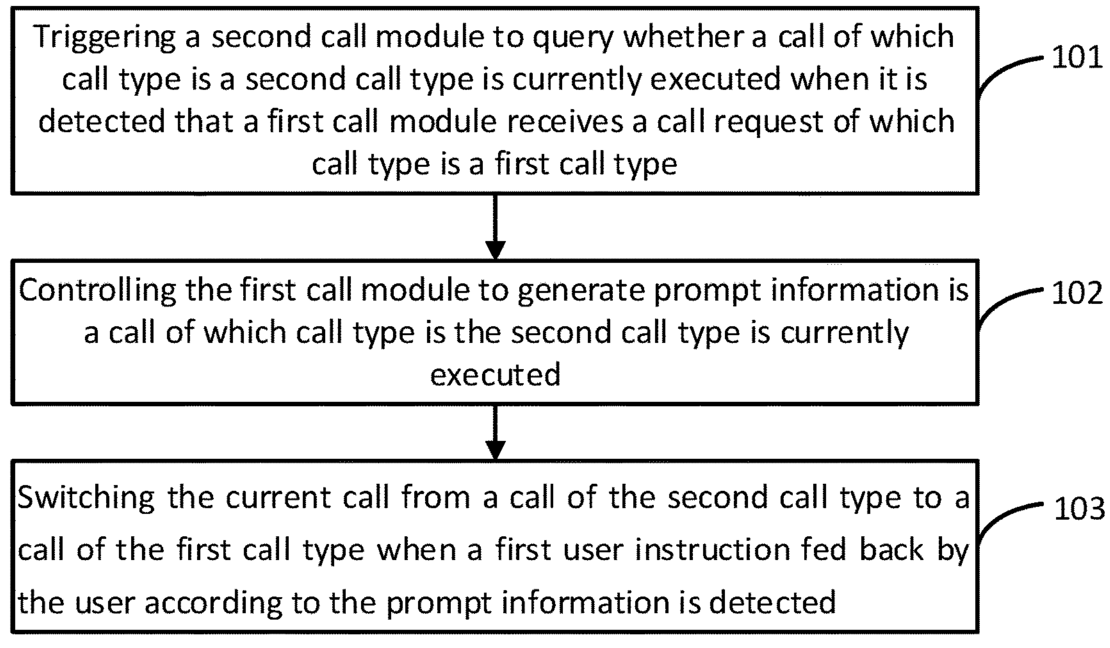
FIG. 1 is a first schematic flowchart of a call switching method provided by an embodiment of the present application.

Please refer to FIG. 1. FIG. 1 is a first schematic flowchart of a call switching method provided by an embodiment of the present application. The call switching method comprises:

Step 101: When it is detected that a first call module receives a call request of which call type is a first call type, triggering a second call module to query whether a call of which call type is a second call type is currently executed.

In particular, a mobile terminal may be a mobile phone, a tablet computer, a notebook computer, a personal digital assistant, etc. A variety of application programs are stored in the mobile terminal, such as applications with entertainment functions (such as video applications, social applications, game applications, reading software) and applications with service functions (such as map navigation applications, catering applications, etc.).

Figure 2:
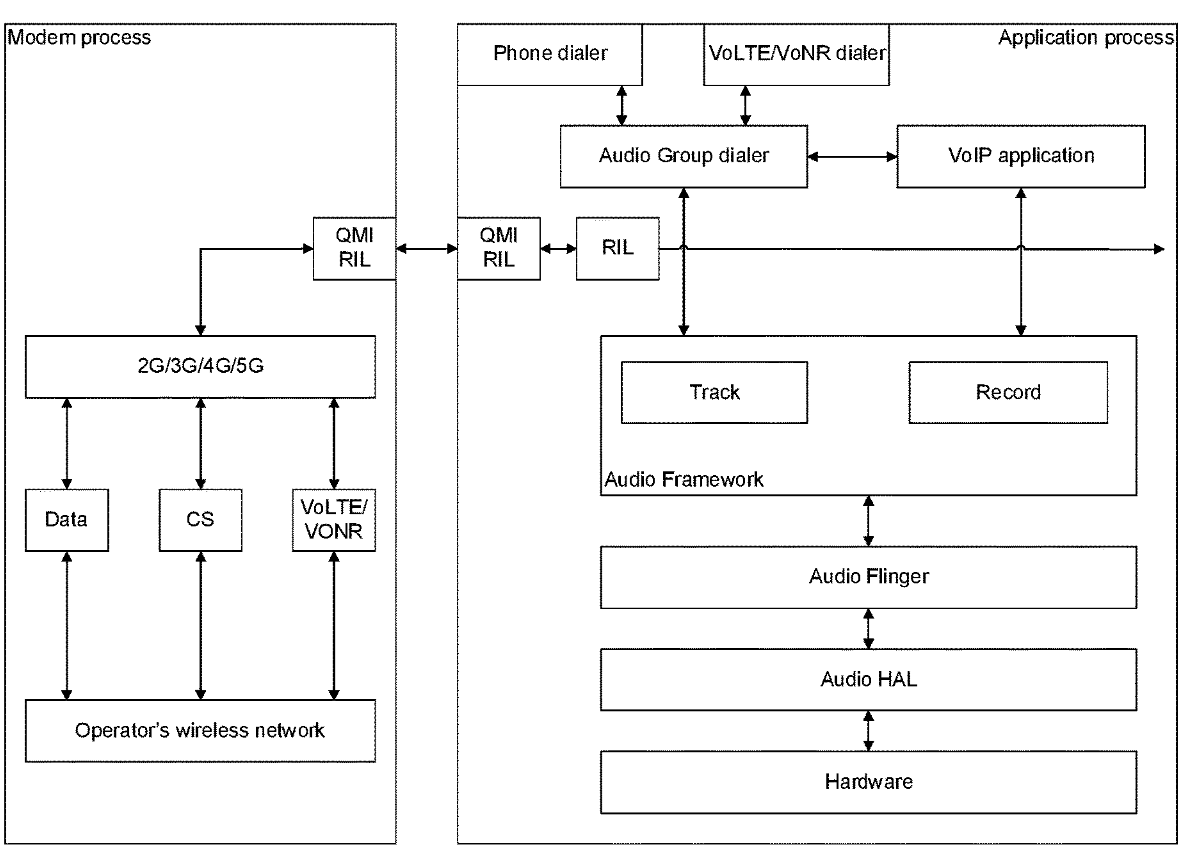
FIG. 2 is a schematic diagram a processing flow of a mobile terminal provided by an embodiment of the present application receiving CS voice, VoLTE voice, and OTT voice.

Here, the first call type is CS of 2G/3G, VoLTE of 4G, and the second call type is OTT as an example. Correspondingly, the first call module is an audio group dialer module (Audio Group dialer), and the second call module is a VoIP application module (VoIP application). Please refer to FIG. 2. FIG. 2 is a schematic diagram of a processing flow of a mobile terminal receiving CS voice, VoLTE voice, and OTT voice according to an embodiment of the present application.

For different call types, the first call type and the second call type are detailed in the following. Regarding the first call type, in a modem process stage, when the CS or VoLTE/VoNP receives the signal sent by the operator's network, the information is sent to the RLL module. The RLL module notifies the first call module (Audio Group dialer), and subsequently the first call module triggers the Phone dialer to activate an answering request. When the answering request is confirmed by the user, the RIL transmits the voice data to the Audio framework module, so as to connect with the hardware such as the MIC and SPEAKER of the terminal. When a call is in progress, the phone dialer module is controlled by the audio group dialer module and the Audio framework. When the Phone dialer triggers an on-hook request, the RIL disconnects the connection with the Audio framework module and the first call module.

Regarding the second call type, in the modem process stage, when Data receives the data sent by the operator's network, the data is sent to the RLL module. The RLL module notifies the second call module (VoIP application), and the VoIP dialer sub-module of the second call module activates an answering request. When the answering request is confirmed by the user, the RIL transmits the voice data to the Audio framework module, so as to connect with the hardware such as the MIC and SPEAKER of the terminal. When a call is in progress, the VoIP dialer sub-module is controlled by the Audio framework. When the VoIP dialer triggers an on-hook request, the RIL disconnects the connection with the Audio framework module and the VoIP application module.

When receiving a call request of which call type is the first call type, in order to avoid problems, such as a conflict which is induced when the second call module is executing a call of the second call type at the same time, the first call module sends a query instruction to the second call module, or the processor triggers the second call module to query whether a call of the second call type is currently executed.

Step 102: If a call of which call type is the second call type is currently executed, controlling the first call module to generate prompt information.

If the second call module queries that a call of the second call type (i.e., an OTT call) is currently executed, the first call module is controlled to generate prompt information. The first call module may be controlled by the second call module or the processor, which is not limited herein. The generated prompt information may be generated from the Phone dialer or VoLTE dialer controlled by the first call module (Audio Group dialer).

The second call module can query whether a call of the second call type currently exists by means of a query list, as shown in Table 1.

TABLE 1

| Call type | Corresponding dialer module | In call or not |
| --- | --- | --- |
| CS voice | Phone dialer | No |
| VoLTE voice | VoLTE dialer | No |
| OTT voice (first application) | VoIp application (first application) | Yes |
| OTT voice (second application) | VoIP application (second application) | Yes |
| . . . | . . . | . . . |

In particular, the first application and the second application in Table 1 are the applications with voice call functions such as WeChat and QQ. For each type of voice application installed in the mobile terminal, a row is added to complete the list. When one voice call is enabled and in progress, the corresponding program and call state in the list are marked as "Yes". After the call is completed, the corresponding call state is marked as "No".

Therefore, triggering the second call module to query whether a call of the second call type is currently executed may comprise:

triggering the second call module to query the call state of the current call of the second call type.

Correspondingly, the controlling the first call module to generate the prompt information if a call of which call type is the second call type is currently executed may comprise:

controlling the first call module to generate the prompt information if the call state of the current call of the second call type is a first call state.

The prompt information can be an answer and hanging-up button presented on the mobile terminal. The user can perform operations by clicking on the corresponding area of the answer or hanging-up button on the screen.

Step 103: When a first user instruction fed back by the user according to the prompt information is detected, switching the current call from a call of the second call type to a call of the first call type.

Specifically, the first user instruction is a corresponding response made by the user according to the effect presented by the prompt information, such as clicking on the area corresponding to the answer button on the screen. When the user instruction is detected, it can be determined that the user wants to answer the call of the first call type. Then, the current call is switched from the call of the second call type to the call of the first call type.

After the current call is switched from the call of the second call type to the call of the first call type, the list needs to be updated, that is, the call state of the call of the second call type is marked as "No", and the call state of the call of the first call type is marked as "Yes". Therefore, after the current call is switched from the call of the second call type to the call of the first call type when the first user instruction fed back by the user according to the prompt information is detected, the method further comprises:

marking the call state of the call of the second call type as the second call state, and marking the call state of the call of the first call type as the first call state.

If the second module queries that the call state of the current call of the second call type is "No", the call of which call type is the first call type can be directly executed.

Therefore, the method also comprises:

executing a call of which call type is the first call type if the call state of the current call of the second call type is the second call state.

After the call of the first call type is executed, the call state in the list needs to be updated, that is, the call state of the call of the first call type is marked as "Yes".

Therefore, after the call of which call type is the first call type is executed, the method further comprises:

marking the call state of the call of the first call type as the first call state.

The call switching method provided by the embodiment of the present application comprises: triggering a second call module to query whether a call of which call type is a second call type is currently executed when it is detected that a first call module receives a call request of which call type is a first call type; controlling the first call module to generate prompt information if a call of which call type is the second call type is currently executed; switching the current call from a call of the second call type to a call of the first call type when a first user instruction fed back by the user according to the prompt information is detected. By establishing interaction between the first call module and the second call module, the conflicts and poor experience which is induced when multiple types of calls are used can be avoided.

Figures 3, 4:
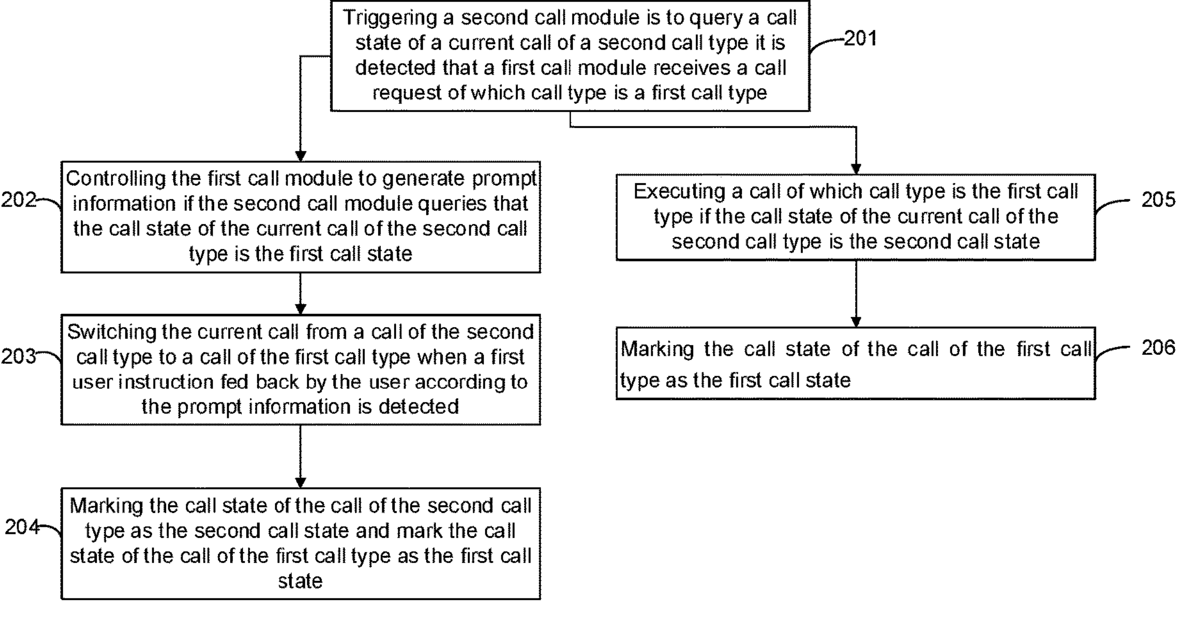
FIG. 3 is a second schematic flowchart of a call switching method provided by an embodiment of the present application.
FIG. 4 is a schematic structural diagram of a call switching apparatus provided by an embodiment of the present application.

In some embodiments, as shown in FIG. 3, a call switching method is provided, and the call switching method comprises:

Step 201: When it is detected that a first call module receives a call request of which call type is a first call type, triggering a second call module is to query a call state of a current call of a second call type.

In particular, a mobile terminal may be a mobile phone, a tablet computer, a notebook computer, a personal digital assistant, etc. A variety of application programs are stored in the mobile terminal, such as applications with entertainment functions (such as video applications, social applications, game applications, reading software) and applications with service functions (such as map navigation applications, catering applications, etc.).

Here, the first call type is CS of 2G/3G, VoLTE of 4G, and the second call type is OTT as an example. Correspondingly, the first call module is an audio group dialer module (Audio Group dialer), and the second call module is a VoIP application module (VoIP application). Please refer to FIG. 2. FIG. 2 is a schematic diagram of a processing flow of a mobile terminal receiving CS voice, VoLTE voice, and OTT voice according to an embodiment of the present application.

For different call types, the first call type and the second call type are detailed in the following. Regarding the first call type, in the modem process stage, when the CS or VoLTE/VoNP receives the signal sent by the operator's network, the information is sent to the RLL module. The RLL module notifies the first call module (Audio Group dialer), and then the first call module triggers the Phone dialer to activate an answering request. When the answering request is confirmed by the user, the RIL transmits the voice data to the Audio framework module, so as to connect with the hardware such as the MIC and SPEAKER of the terminal. When a call is in progress, the phone dialer module is controlled by the audio group dialer module and the Audio framework. When the Phone dialer triggers an on-hook request, the RIL disconnects the connection with the Audio framework module and the first call module.

Regarding the second call type, in the modem process stage, when Data receives the data sent by the operator's network, the data is sent to the RLL module. The RLL module notifies the second call module (VoIP application), and the VoIP dialer sub-module of the second call module activates an answering request. When the answering request is confirmed by the user, the RIL transmits the voice data to the Audio framework module, so as to connect with the hardware such as the MIC and SPEAKER of the terminal. When a call is in progress, the VoIP dialer sub-module is controlled by the Audio framework. When the VoIP dialer triggers an on-hook request, the RIL disconnects the connection with the Audio framework module and the VoIP application module.

When the first call module receives a call request of which call type is the first call type, in order to avoid problems, such as a conflict which is induced when the second call module is executing a call of the second call type at the same time, it sends a query instruction to the second call module, or the processor triggers the second call module to query whether a call of the second call type is currently executed.

The second call module can query whether a call of the second call type currently exists by means of a query list, as shown in Table 2.

TABLE 2

| Call type | Corresponding dialer module | In call or not |
|---|---|---|
| CS voice | Phone dialer | No |
| VoLTE voice | VoLTE dialer | No |
| OTT voice (first application) | VoIp application (first application) | Yes |
| OTT voice (second application) | VoIP application (second application) | Yes |
| . . . | . . . | . . . |

In particular, the first application and the second application in Table 1 are the applications with voice call functions such as WeChat and QQ. For each type of voice application installed in the mobile terminal, a row is added to complete the list. When one voice call is enabled and in progress, the corresponding program and call state in the list are marked as "Yes". After the call is completed, the corresponding call state is marked as "No".

Step 202: If the call state of the current call of the second call type is a first call state, controlling the first call module to generate prompt information.

If the second call module queries that the call state of the current call of the second call type is the first call state, the first call module is controlled to generate prompt information. The first call module may be controlled by the second call module or the processor, which is not limited herein. The generated prompt information may be generated from the Phone dialer or VoLTE dialer controlled by the first call module (Audio Group dialer).

Step 203: When a first user instruction fed back by the user according to the prompt information is detected, switching the current call from a call of the second call type to a call of the first call type.

Specifically, the first user instruction is a corresponding response made by the user according to the effect presented by the prompt information, such as clicking on the area corresponding to the answer button on the screen. When the user instruction is detected, it can be determined that the user wants to answer the call of the first call type. Then, the current call is switched from the call of the second call type to the call of the first call type.

Step 204: Marking the call state of the call of the second call type as the second call state and marking the call state of the call of the first call type as the first call state.

After the current call is switched from the call of the second call type to the call of the first call type, the list needs to be updated, that is, the call state of the call of the second call type is marked as "No", and the call state of the call of the first call type is marked as "Yes".

Step 205: If the call state of the current call of the second call type is the second call state, executing a call of which call type is the first call type.

If the second module queries that the call state of the current call of the second call type is "No", the call of which call type is the first call type can be directly executed.

Step 206: Marking the call state of the call of the first call type as the first call state.

After the call of the first call type is executed, the call state in the list needs to be updated, that is, the call state of the call of the first call type is marked as "Yes".

It should be noted that the embodiment provided in this application is only for illustration in which the first call type is CS of 2G/3G, VoLTE of 4G, and the second call type is OTT as an example. However, the first call type may be OTT, and the second call type may be CS of 2G/3G, VoLTE of 4G. The corresponding dialer modules that are used when the above steps are performed can be replaced accordingly, without limitation to the case in which the first call type is CS of 2G/3G, VoLTE of 4G and the second call type is OTT.

The call switching method provided by the embodiment of the present application comprises: triggering a second call module to query whether a call of which call type is a second call type is currently executed when it is detected that a first call module receives a call request of which call type is a first call type; controlling the first call module to generate prompt information if a call of which call type is the second call type is currently executed; switching the current call from a call of the second call type to a call of the first call type when a first user instruction fed back by the user according to the prompt information is detected. By establishing interaction between the first call module and the second call module, the conflicts and poor experience which is induced when multiple types of calls are used can be avoided.

Please refer to FIG. 4. FIG. 4 is a schematic structural diagram of a call switching apparatus provided by an embodiment of the present application. The call switching apparatus comprises: a query unit 31, a generating unit 32, and a switching unit 33.

In particular, the query unit 31 is configured to trigger a second call module to query whether a call of which call type is a second call type is currently executed when it is detected that a first call module receives a call request of which call type is a first call type.

In particular, a mobile terminal may be a mobile phone, a tablet computer, a notebook computer, a personal digital assistant, etc. A variety of application programs are stored in the mobile terminal, such as applications with entertainment functions (such as video applications, social applications, game applications, reading software) and applications with service functions (such as map navigation applications, catering applications, etc.).

Here, the first call type is CS of 2G/3G, VoLTE of 4G, and the second call type is OTT as an example. Correspondingly, the first call module is an audio group dialer module (Audio Group dialer), and the second call module is a VoIP application module (VoIP application). Please refer to FIG. 2. FIG. 2 is a schematic diagram of a processing flow of a mobile terminal receiving CS voice, VoLTE voice, and OTT voice according to an embodiment of the present application.

For different call types, the first call type and the second call type are detailed in the following. Regarding the first call type, in the modem process stage, when the CS or VoLTE/VoNP receives the signal sent by the operator's network, the information is sent to the RLL module. The RLL module notifies the first call module (Audio Group dialer), and then the first call module triggers the Phone dialer to activate an answering request. When the answering request is confirmed by the user, the RIL transmits the voice data to the Audio framework module, so as to connect with the hardware such as the MIC and SPEAKER of the terminal. When a call is in progress, the phone dialer module is controlled by the audio group dialer module and the Audio framework. When the Phone dialer triggers an on-hook request, the RIL disconnects the connection with the Audio framework module and the first call module.

Regarding the second call type, in the modem process stage, when Data receives the data sent by the operator's network, the data is sent to the RLL module. The RLL module notifies the second call module (VoIP application), and the VoIP dialer sub-module of the second call module activates an answering request. When the answering request is confirmed by the user, the RIL transmits the voice data to the Audio framework module, so as to connect with the hardware such as the MIC and SPEAKER of the terminal. When a call is in progress, the VoIP dialer sub-module is controlled by the Audio framework. When the VoIP dialer triggers an on-hook request, the RIL disconnects the connection with the Audio framework module and the VoIP application module.

When the first call module receives a call request of which call type is the first call type, in order to avoid problems, such as a conflict which is induced when the second call module is executing a call of the second call type at the same time, it sends a query instruction to the second call module, or the processor triggers the second call module to query whether a call of the second call type is currently executed.

The generating unit 32 is configured to control the first call module to generate prompt information if a call of which call type is the second call type is currently executed.

If the second call module queries that a call of the second call type (i.e., an OTT call) is currently executed, the first call module is controlled to generate prompt information. The first call module may be controlled by the second call module or the processor, which is not limited herein. The generated prompt information may be generated from the Phone dialer or VoLTE dialer controlled by the first call module (Audio Group dialer).

The switching unit 33 is configured to switch the current call from the call of the second call type to the call of the first call type when a first user instruction fed back by the user according to the prompt information is detected.

Specifically, the first user instruction is a corresponding response made by the user according to the effect presented by the prompt information, such as clicking on the area corresponding to the answer button on the screen. When the user instruction is detected, it can be determined that the user wants to answer the call of the first call type. Then, the current call is switched from the call of the second call type to the call of the first call type.

In some embodiments, the query unit 31 is specifically configured to trigger the second call module to query the call state of the current call of the second call type.

The generating unit 32 is specifically configured to control the first call module to generate the prompt information if the call state of the current call of the second call type is a first call state.

In some embodiments, the call switching apparatus further comprises:

a marking unit configured to mark the call state of the call of the second call type as the second call state and mark the call state of the call of the first call type as the first call state.

Based on the above method, the present invention also provides a storage medium in which a plurality of instructions are stored, wherein the instructions are suitable for being loaded by a processor to perform the above call switching method.

A person having ordinary skill in the art can understand that all or part of the steps in the various methods of the above embodiments can be completed by instructing relevant hardware through a program, and the program can be stored in a computer-readable storage medium, and the storage medium may comprise: a read only memory (ROM, Read Only Memory), a random access memory (RAM, Random Access Memory), a magnetic disk, or an optical disk, etc.

An embodiment of the present application further provides a mobile terminal. The mobile terminal comprises a processor and a memory. A computer program is stored in the memory. The processor is used to execute a call switching method by calling the computer program stored in the memory. The call switching method comprises:

triggering a second call module to query whether a call of which call type is a second call type is currently executed when it is detected that a first call module receives a call request of which call type is a first call type;

controlling the first call module to generate prompt information if a call of which call type is the second call type is currently executed;

switching the current call from a call of the second call type to a call of the first call type when a first user instruction fed back by the user according to the prompt information is detected, wherein the first call module is an audio group dialer module, and the second call module is a VoIP application module.

In particular, the triggering a second call module to query whether a call of which call type is a second call type is currently executed comprises:

triggering the second call module to query the call state of the current call of the second call type.

The controlling the first call module to generate prompt information if a call of which call type is the second call type is currently executed comprises:

controlling the first call module to generate the prompt information if the call state of the current call of the second call type is a first call state.

In particular, when the first user instruction fed back by the user according to the prompt information is detected, after the current call is switched from the call of the second call type to the call of the first call type, the method further comprises:

marking the call state of the call of the second call type as the second call state, and marking the call state of the call of the first call type as the first call state.

The method further comprises:

executing a call of which call type is the first call type if the call state of the current call of the second call type is the second call state.

In particular, after the call of which call type is the first call type is executed, the method further comprises:

marking the call state of the call of the first call type as the first call state.

Figure 5:
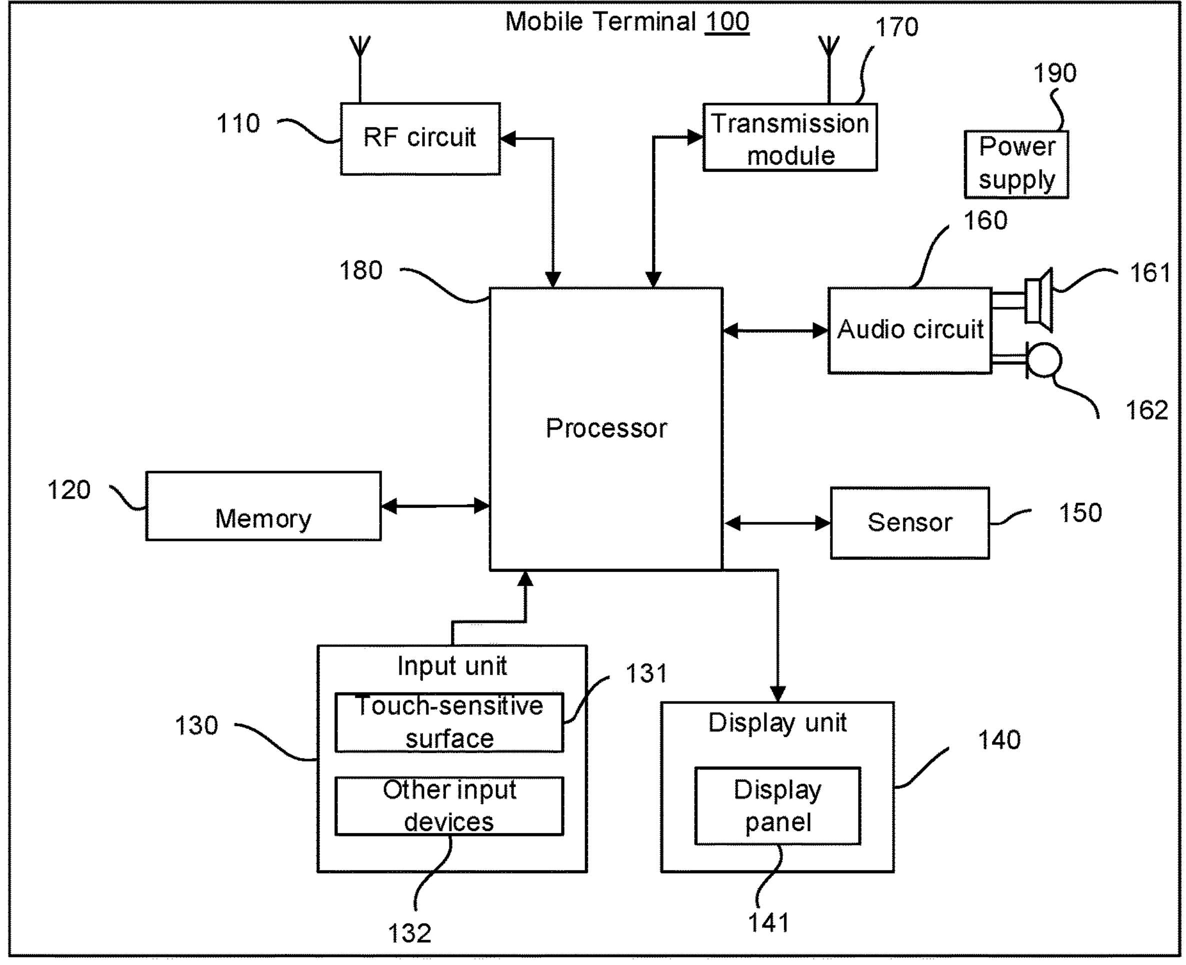
FIG. 5 is a specific structural diagram of a mobile terminal provided by an embodiment of the present application.

FIG. 5 shows a specific structural block diagram of a terminal provided by an embodiment of the present invention. The terminal can be used to implement the call switching method, storage medium, and terminal provided in the foregoing embodiments.

As shown in FIG. 5, a mobile terminal 1200 may comprise an RF (Radio Frequency, radio frequency) circuit 110, a memory 120 including one or more (only one is shown in the figure) computer-readable storage medium, an input unit 130, a display unit 140, a sensor 150, an audio circuit 160, a transmission module 170, a processor 180 including one or more (only one is shown in the figure) processing cores, a power supply 190, and other components. A person having ordinary skill in the art can understand that the structure of the mobile terminal 1200 shown in FIG. 5 does not provide a limitation to the mobile terminal 1200. The mobile terminal 1200 may comprise more or less components than those shown in the figure, or combine some components, or have a different component arrangement. Wherein:

The RF circuitry 110 may comprise various existing circuit elements for performing these functions, e.g., an antennas, a radio frequency transceivers, a digital signal processor, an encryption/decryption chip, a subscriber identity module (SIM) card, a memory, and the like. The RF circuit 110 may communicate with various networks such as the Internet, an intranet, a wireless network, or with a second device over a wireless network. The aforementioned wireless network may comprise a cellular telephone network, a wireless local area network, or a metropolitan area network.

The memory 120 can be used to store software programs and modules, such as the program instructions/modules corresponding to the call switching method, apparatus, storage medium and mobile terminal in the above-mentioned embodiments. The processor 180 executes various functional applications and data processing by running the software programs and modules stored in the memory 120, that is, the function of mutual recognition of chips is realized. The memory 120 may comprise a high-speed random access memory, and may also comprise non-volatile memory, such as one or more magnetic storage devices, flash memory, or a second non-volatile solid-state memory. In some examples, the memory 120 may be a storage medium as described above.

The input unit 130 may be used to receive input numerical or character information and generate keyboard, mouse, joystick, optical or trackball signal input related to user settings and function control. Specifically, the input unit 130 may comprise a touch-sensitive surface 131 and other input devices 132. The touch-sensitive surface 131, also known as a touch display or trackpad, can collect user touch operations on or near it (such as operations of a user using a finger, a stylus, or any suitable object or accessory on or near the touch-sensitive surface 131) and drive the corresponding connection device according to a preset program. Optionally, the touch-sensitive surface 131 may comprise two portions, a touch detection device and a touch controller.

The display unit 140 may be used to display information input by the user or provided to the user and various graphical user interfaces of the mobile terminal 1200. These graphical user interfaces may be composed of graphics, text, icons, videos, and any combination thereof. The display unit 140 may comprise a display panel 141. Further, the touch-sensitive surface 131 may cover the display panel 141. The display interface of the mobile terminal in the above embodiment may be represented by the display unit 140. That is, the display content displayed on the display interface may be displayed by the display unit 140.

The mobile terminal 1200 may further comprise at least one sensor 150, such as a light sensor, a motion sensor, and a second sensor. Specifically, the light sensor may comprise an ambient light sensor and a proximity sensor, wherein the ambient light sensor may adjust the brightness of the display panel 141 according to the brightness of the ambient light, and the proximity sensor may turn off the display panel 141 and/or the backlight when the mobile terminal 1200 is moved to the ear. As for the second sensor, such as a gyroscope, a barometer, a hygrometer, a thermometer, and an infrared sensor, that is arranged in the mobile terminal 1200, the details are not described here.

The audio circuit 160, the speaker 161, and the microphone 162 may provide audio interfaces between the user and the mobile terminal 1200. The audio circuit 160 can transmit the electrical signal which is converted from the received audio data to the speaker 161, and the speaker 161 converts it into a sound signal for output. On the other hand, the microphone 162 converts the collected sound signal into an electrical signal, which is received and converted into audio data by the audio circuit 160. The audio data is output to the processor 180 for processing and then sent to, for example, another terminal through the RF circuit 110, or the audio data is output to the memory 120 for further processing. The audio circuit 160 may also comprise an earplug jack to provide a communication between a peripheral headset and the mobile terminal 1200.

The mobile terminal 1200 can help the user to send and receive emails, browse web pages, access streaming media, etc. through the transmission module 170, which provides the user with wireless broadband Internet access.

The processor 180 is the control center of the mobile terminal 1200. The processor 180 uses various interfaces and lines to connect various parts of the entire mobile phone, runs or executes the software programs and/or modules stored in the memory 120, calls the data stored in the memory 120, performs various functions of the mobile terminal 1200, and processes data, so as to monitor the mobile phone. Optionally, the processor 180 may comprise one or more process cores. In some embodiments, the processor 180 may integrate an application processor and a modem processor, wherein the application processor mainly handles the operating system, user interfaces and applications, etc., and the modem processor mainly handles wireless calls. It can be understood that the above-mentioned modem processor may not be integrated into the processor 180.

Specifically, the processor 180 comprises: an arithmetic logic unit (Arithmetic Logic Unit, ALU), an application processor, a global positioning system (Global Positioning System, GPS), and a control and status bus (Bus) (not shown in the figure).

The mobile terminal 1200 also comprises a power source 190 (such as a battery) for providing power to various components. In some embodiments, the power source can be logically connected to the processor 180 through a power management system, so as to manage power supply, discharge, power consumption, and other functions through the power management system. The power source 190 may also comprise one or more direct-current or alternating-current power sources, re-powering systems, power-failure detection circuits, power converters or inverters, power status indicators, and any other components.

Although not shown, the mobile terminal 1200 may further comprise a camera (e.g., a front camera, a rear camera), a Bluetooth module, and the like, which will not be described in detail here.

Specifically, in the embodiment, the display unit 140 of the mobile terminal 1200 is a touch screen display. The mobile terminal 1200 further comprises a memory 120 and one or more programs, wherein the one or more programs are stored in the memory 120, and the one or more processors 180 are configured to execute the one or more programs, including instructions for the following operations:

triggering a second call module to query whether a call of which call type is a second call type is currently executed when it is detected that a first call module receives a call request of which call type is a first call type, controlling the first call module to generate prompt information if a call of which call type is the second call type is currently executed;

switching the current call from a call of the second call type to a call of the first call type when a first user instruction fed back by the user according to the prompt information is detected.

In some embodiments, when the second call module is triggered to query whether a call of which call type is the second call type is currently executed, the processor 180 further executes the instructions of the following operation:

triggering the second call module is to query the call state of the current call of the second call type.

When the first call module is controlled to generate the prompt information if a call of which call type is the second call type is currently executed, the processor 180 may further execute the instructions of the following operation: controlling the first call module to generate the prompt information if the call state of the current call of the second call type is a first call state.

In some embodiments, after the current call is switched from the call of the second call type to the call of the first call type when the first user instruction fed back by the user according to the prompt information is detected, the processor 180 may further execute the instructions of the following operation:

marking the call state of the call of the second call type as the second call state, and marking the call state of the call of the first call type as the first call state.

In some embodiments, the processor 180 may further execute the instructions of the following operation:

executing a call of which call type is the first call type if the call state of the current call of the second call type is the second call state.

In some embodiments, after the call of which call type is the first call type is executed, the processor 180 may further execute the instructions of the following operation:

marking the call state of the call of the first call type as the first call state.

In the above-mentioned embodiments, the description of each embodiment has its own emphasis. For parts that are not described in detail in a certain embodiment, reference may be made to the relevant descriptions of other embodiments.

The call switching method, apparatus, storage medium, and mobile terminal provided by the embodiments of the present application are described above in detail. The principles and implementations of the present application are described with specific examples. The descriptions of the above embodiments are only helpful for understanding the technical solutions of the present application and its core idea. A person having ordinary skill in the art should understand that: the technical solutions recorded in the foregoing embodiments can be modified, or some of the technical features can be replaced with equivalents. These modification or replacement do not make the essence of the corresponding technical solutions deviate from the scope of the technical solutions of the embodiments of the present application.

What is claimed is:

1. A call switching method, comprising:

triggering a second call module to query a query list to determine whether a call of which call type is a second call type is currently executed when it is detected that a first call module receives a call request of which call type is a first call type, wherein the query list comprises an association relationship among call types, corresponding dialer modules, and call states indicating whether the corresponding dialer module is in a call;

controlling the first call module to generate prompt information if a call of which call type is the second call type is currently executed;

switching from a call of the second call type to a call of the first call type when a first user instruction fed back by a user according to the prompt information is detected.

2. The call switching method of claim 1, wherein the triggering a second call module to query whether a call of which call type is a second call type is currently executed comprises:

triggering the second call module to query a call state of the current call of the second call type;

the controlling the first call module to generate prompt information if a call of which call type is the second call type is currently executed comprises:

controlling the first call module to generate prompt information if the call state of the current call of the second call type is a first call state.

3. The call switching method of claim 2, wherein after the switching a current call from a call of the second call type to a call of the first call type when a first user instruction fed back by a user according to the prompt information is detected, the method further comprises:

marking a call state of the call of the second call type as a second call state and marking a call state of the call of the first call type as the first call state.

4. The call switching method of claim 3, wherein the method further comprises:

executing a call of which call type is the first call type if the call state of the current call of the second call type is the second call state.

5. The call switching method of claim 4, wherein after the executing a call of which call type is the first call type, the method further comprises:

marking the call state of the call of the first call type as the first call state.

6. The call switching method of claim 2, wherein the call state of the current call shows whether the current call is in call or not.

7. The call switching method of claim 1, wherein the first call type is one of a circuit switched (CS) voice call, Internet Protocol (IP) multimedia subsystem (IMS) voice call, or over the top (OTT) voice call, and the second call type is another one of CS voice call, IMS voice call, or OTT voice call; and the IMS voice call comprises voice over long term evolution (VOLTE) or voice over WIFI (VoWiFi).

8. A call switching apparatus, comprising:

a query unit configured to trigger a second call module to query a query list to determine whether a call of which call type is a second call type is currently executed when it is detected that a first call module receives a call request of which call type is a first call type, wherein the query list comprises an association relationship among call types, corresponding dialer modules, and call states indicating whether the corresponding dialer module is in a call;

a generating unit configured to control the first call module to generate prompt information if a call of which call type is the second call type is currently executed;

a switching unit configured to switch from a call of the second call type to a call of the first call type when a first user instruction fed back by a user according to the prompt information is detected.

9. The call switching apparatus of claim 8, wherein the query unit is specifically configured to trigger the second call module to query a call state of the current call of the second call type; the generating unit is specifically configured to control the first call module to generate prompt information if the call state of the current call of the second call type is a first call state.

10. The call switching apparatus of claim 9, wherein the call switching apparatus further comprises:

a marking unit configured to mark a call state of the call of the second call type as a second call state and mark a call state of the call of the first call type as the first call state.

11. The call switching apparatus of claim 9, wherein the first call type is one of a circuit switched (CS) voice call, Internet Protocol (IP) multimedia subsystem (IMS) voice call, or over the top (OTT) voice call, and the second call type is another one of CS voice call, IMS voice call, or OTT voice call; and the IMS voice call comprises voice over long term evolution (VOLTE) or voice over WIFI (VoWiFi).

12. The call switching apparatus of claim 9, wherein the call state of the current call shows whether the current call is in call or not.

13. A mobile terminal, wherein the mobile terminal comprises a processor and a memory, the memory stores a computer program, the processor calls the computer program stored in the memory to perform a call switching method, the call switching method comprises:

triggering a second call module to query a query list to determine whether a call of which call type is a second call type is currently executed when it is detected that a first call module receives a call request of which call type is a first call type, wherein the query list comprises an association relationship among call types, corresponding dialer modules, and call states indicating whether the corresponding dialer module is in a call;

controlling the first call module to generate prompt information if a call of which call type is the second call type is currently executed;

switching from a call of the second call type to a call of the first call type when a first user instruction fed back by a user according to the prompt information is detected, wherein the first call module is an audio group dialer module, and the second call module is a VoIP application module.

14. The mobile terminal of claim 13, wherein the triggering a second call module to query whether a call of which call type is a second call type is currently executed comprises:

triggering the second call module to query a call state of the current call of the second call type;

the controlling the first call module to generate prompt information if a call of which call type is the second call type is currently executed comprises:

controlling the first call module to generate prompt information if the call state of the current call of the second call type is a first call state.

15. The mobile terminal of claim 14, wherein after the switching a current call from a call of the second call type to a call of the first call type when a first user instruction fed back by a user according to the prompt information is detected, the method further comprises:

marking a call state of the call of the second call type as a second call state and marking a call state of the call of the first call type as the first call state.

16. The mobile terminal of claim 15, wherein the method further comprises:

executing a call of which call type is the first call type if the call state of the current call of the second call type is the second call state.

17. The mobile terminal of claim 16, wherein after the executing a call of which call type is the first call type, the method further comprises:

marking the call state of the call of the first call type as the first call state.

18. The mobile terminal of claim 14, wherein the call state of the current call shows whether the current call is in call or not.

19. The mobile terminal of claim 13, wherein the first call type is one of a circuit switched (CS) voice call, Internet Protocol (IP) multimedia subsystem (IMS) voice call, or over the top (OTT) voice call, and the second call type is another one of CS voice call, IMS voice call, or OTT voice call; and the IMS voice call comprises voice over long term evolution (VOLTE) or voice over WIFI (VoWiFi).

* * * * *